United States Patent
Hanai

(10) Patent No.: US 7,237,452 B2
(45) Date of Patent: Jul. 3, 2007

(54) THROTTLE GRIP APPARATUS

(75) Inventor: Shozo Hanai, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 108 days.

(21) Appl. No.: 10/823,678

(22) Filed: Apr. 14, 2004

(65) Prior Publication Data

US 2004/0226397 A1 Nov. 18, 2004

(30) Foreign Application Priority Data

May 13, 2003 (JP) .................. P. 2003-134402

(51) Int. Cl.
*B62K 23/04* (2006.01)

(52) U.S. Cl. ........................................ 74/491

(58) Field of Classification Search ............. 74/543, 74/504, 491, 495, 501.6, 502, 551.9; 180/335; 267/272, 167

See application file for complete search history.

(56) References Cited

U.S. PATENT DOCUMENTS 3,788,631 A * 1/1974 Aldous .................... 267/156

| | | | |
|---|---|---|---|
| RE34,302 E * | 7/1993 | Imoehl ................. 123/399 |
| 6,276,230 B1 | 8/2001 | Crum et al. |
| 6,978,694 B2 * | 12/2005 | Peppard ................ 74/489 |
| 2004/0065165 A1 * | 4/2004 | Sekiya et al. ........... 74/491 |

FOREIGN PATENT DOCUMENTS

| | | |
|---|---|---|
| DE | 100 27 193 A1 | 12/2001 |
| JP | 4-254278 A | 9/1992 |
| JP | 2002-256903 A | 9/2002 |
| JP | 2003-127959 A | 5/2003 |

* cited by examiner

*Primary Examiner*—Sherry Estremsky
(74) *Attorney, Agent, or Firm*—Sughrue Mion, PLLC

(57) ABSTRACT

A throttle grip apparatus has a throttle grip rotatably mounted on the leading end of a handlebar of a vehicle; a case disposed on the handlebar at a position being adjacent to the throttle grip; a throttle opening angle sensor for detecting the rotation angle of the throttle grip and disposed in the case, an energizing unit for energizing the throttle grip in a direction to return to the initial position thereof, an engine of a vehicle being controlled in accordance with the detected value of the throttle opening angle sensor wherein the energizing unit includes a spiral spring mounted on the base end side of the throttle grip and having one end fixed to the base end portion of the throttle grip and the other end fixed to the case and the spiral spring is wound up as the throttle grip is rotated from the initial state thereof.

3 Claims, 3 Drawing Sheets

THROTTLE GRIP APPARATUS

BACKGROUND OF THE INVENTION

1. Field of the Invention

The present invention relates to a throttle grip apparatus which not only can control an engine of a vehicle in accordance with the detected value of a throttle opening angle sensor but also includes an energizing unit for returning a throttle grip after rotated to its initial state.

2. Description of the Related Art

In a recent two-wheeled vehicle, there has been spread a throttle grip apparatus structured such that it detects the rotation angle of a throttle grip using a throttle opening angle sensor and sends the thus-detected value as an electric signal to an electronic control device or a similar device carried on board the two-wheeled vehicle. The present throttle grip apparatus is also structured such that the electronic control device executes a given operation in accordance with the electric signal representing the detect value and, in accordance with the result of this operation, the ignition time of the engine of the vehicle or the opening and closing of an exhaust valve can be controlled (a throttle grip apparatus including such throttle opening angle sensor is disclosed, for example, in JP-A-4-254278).

Provision of the above-mentioned throttle opening angle sensor can eliminate the use of an operation cable which has been generally used to transmit the rotation operation of the throttle grip to the engine side. Also, the throttle angle sensor is stored in a case disposed at a position adjacent to the throttle grip; and, in the case, there is also stored a return spring composed of, for example, a torsion spring in order to energize the throttle grip into its initial state all the time. The above-mentioned throttle grip and composing elements to be operated in linking with the throttle grip are collectively referred to as a throttle grip apparatus.

In the above-mentioned conventional throttle grip apparatus, since the rotation angle of the throttle grip is detected using the throttle opening angle sensor, there is eliminated the need for provision of the operation cable which has been generally used for transmission of the rotation operation of the throttle grip to the engine side. However, no use of the operation cable causes the following problems.

That is, in the throttle grip apparatus including the operation cable, in case where the throttle grip is rotated, an inner tube is slided with respect to an outer tube which constitutes the operation cable, so that the sliding resistance of the inner tube is transmitted to the driver side. On the other hand, in the throttle grip apparatus including the throttle opening angle sensor, the power to be transmitted to the driver side when the throttle grip is rotated is limited only to the power that is generated by the return spring to return the throttle grip to the initial position, which strikes the driver as incongruous.

Also, in the throttle grip apparatus including the operation cable, the sliding friction to be generated when the throttle grip is rotated is different from that generated when the throttle grip is returned, thereby generating a so called hysteresis. On the other hand, the return spring composed of a torsion spring and the like is not able to generate such hysteresis and thus cannot eliminate the incongruous feel to be transmitted to the driver when the throttle grip is rotated.

SUMMARY OF THE INVENTION

The present invention aims at eliminating the drawbacks found in the above-mentioned conventional throttle grip apparatus. Accordingly, it is an object of the invention to provide a throttle grip apparatus which includes the throttle opening angle sensor and also, when the throttle grip is rotated, can give the driver the same feel as the feel that is given by the throttle grip apparatus including the operation cable.

In attaining the above object, according to the invention as set forth in a first aspect, there is provided a throttle grip apparatus, having: a throttle grip rotatably mounted on the leading end of a handlebar of a vehicle; a case disposed on the handlebar at a position being adjacent to the throttle grip; a throttle opening angle sensor for detecting the rotation angle of the throttle grip and disposed in the case; and, an energizing unit for energizing the throttle grip in a direction to return to the initial position thereof, an engine of a vehicle being controlled in accordance with the detected value of the throttle opening angle sensor, wherein the energizing unit includes a spiral spring mounted on the base end side of the throttle grip and having one end fixed to the base end portion of the throttle grip and the other end fixed to the case, and the spiral spring is wound up as the throttle grip is rotated from the initial state thereof.

It is preferable that the spiral spring changes in such a manner that the mutually contacted portions of the spiral spring increase gradually with the rotation of the throttle grip.

DETAILED DESCRIPTION OF THE PREFERRED EMBODIMENTS

Now, description will be given below in detail of the preferred embodiment of a throttle grip apparatus according to the invention with reference to the accompanying drawings.

The throttle grip apparatus according to the present embodiment is to be mounted on the right-side leading end portion of the handlebar of a two-wheeled vehicle; and, it is structured such that it detects the rotation angle of a throttle grip using a sensor instead of an operation cable which has been generally used in the conventional throttle grip apparatus, and the value of the thus-detected rotation angle is transmitted in the form of an electric signal to an electronic control device carried on board the two-wheeled vehicle.

Figure 1:
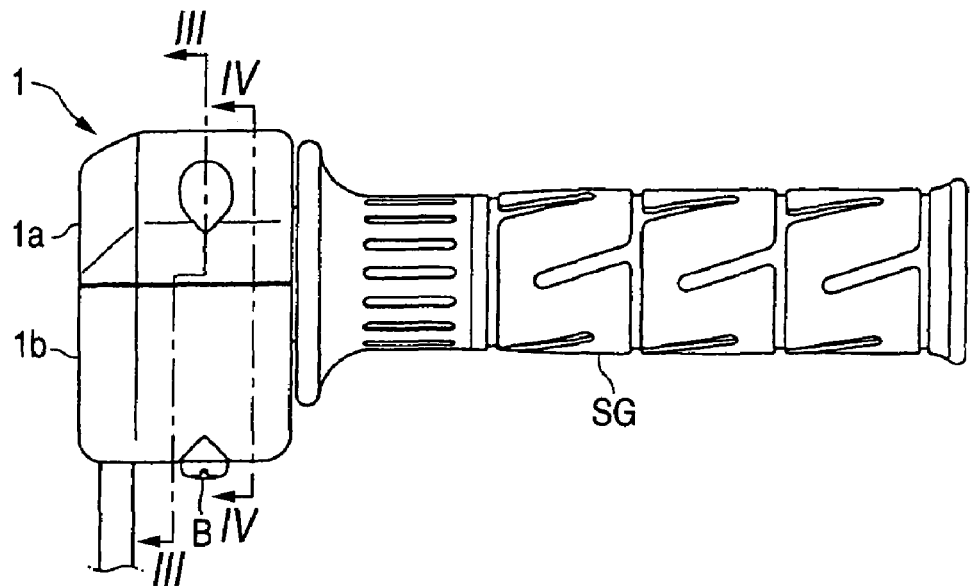
FIG. 1 is a front view of a throttle grip apparatus according to an embodiment of the invention.

Specifically, as shown in FIG. 1, the present throttle grip apparatus has an outward appearance consisting mainly of a throttle grip SG to be mounted onto the right-side leading end portion of a handlebar (not shown) and a case 1 composed of an upper case 1a and a lower case 1b which are originally two-divisional parts and are then matched and fastened to each other by a bolt B into an integral body; and, a driver, while gripping the throttle grip SG, can rotate the throttle grip SG.

The throttle grip SG is structured such that it can be rotated coaxially with the handlebar to thereby provide an accelerator which can obtain an arbitrary engine output; and, in the interior of the throttle grip SG, there is disposed a tube guide 2 in such a manner that it is formed integrally with the throttle grip SG. The tube guide 2 is structured such that it can be rotated together with the throttle grip SG and the base end side thereof is rotatably stored in the case 1.

Figure 2:
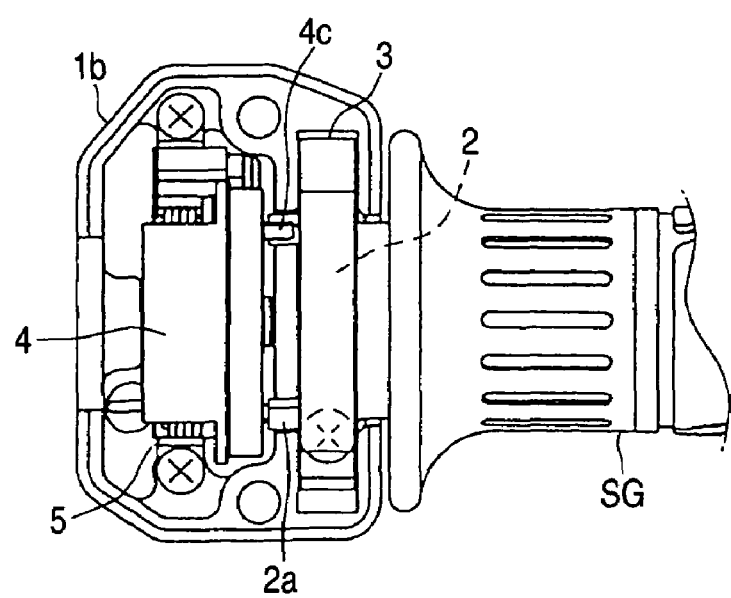
FIG. 2 is a top plan view of the throttle grip apparatus, with an upper case removed therefrom.
Figure 4:
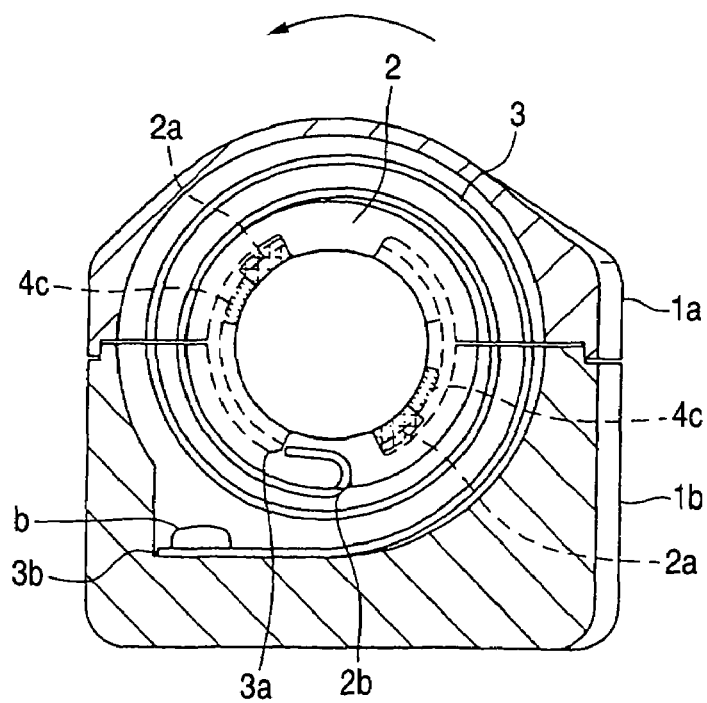
FIG. 4 is a section view taken along the line IV-IV shown in FIG. 1.

Also, on the portion of the base end side of the tube guide 2 (the base end side of the throttle grip SG) that is stored in the case 1, as shown in FIGS. 2 and 4, there is disposed a spiral spring 3 and also there are formed a pair of securing pawls 2a. Of these parts, the spiral spring 3 forms energizing unit for energizing the throttle grip SG in a direction to return it to its initial position.

The spiral spring 3 is structured such that, as shown in FIG. 4, one end 3a thereof is bent and is secured to a recessed portion 2b formed in the tube guide 2 to be thereby fixed thereto, while the other end 3b is fixed to the bottom surface of the inside of the lower case 1b by a screw b. Also, the spiral spring 3 is mounted in such a manner that, when the throttle grip SG is rotated from its initial state, the spiral spring 3 can be wound up toward the base end side of the tube guide 2.

Figure 5:
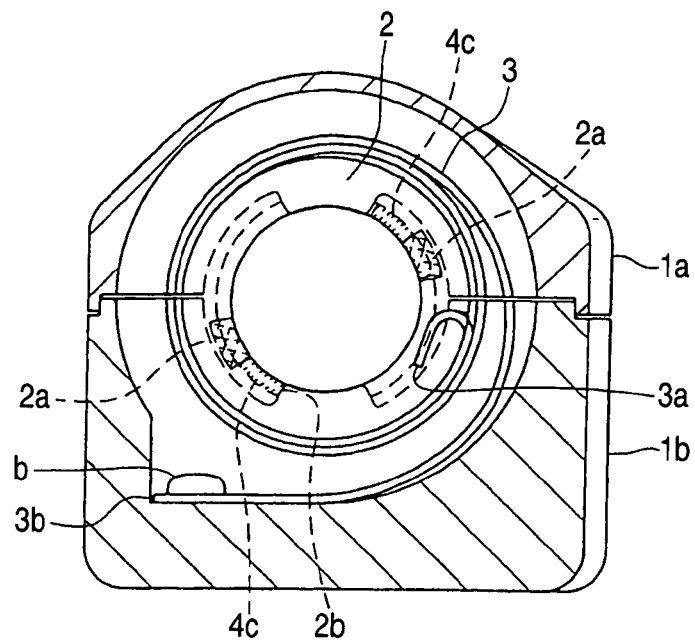
FIG. 5 is a section view, showing a state in which the throttle grip is rotated from the state of FIG. 4 in the arrow mark line; and, FIG. 6 is a graphical representation of the hysteresis characteristic of a spiral spring used in the throttle grip apparatus according to the embodiment of the invention.

That is, in case where the throttle grip SG is rotated in the arrow mark direction shown in FIG. 4 (is rotated from its initial state), there is also rotated the tube guide 2 that is formed integrally with the throttle grip SG; and, therefore, the spiral spring 3, as shown in FIG. 5, is wound up from its initial shape. Accordingly, with the rotation of the throttle grip SG, the mutually contacted portions of the spiral spring 3 increase gradually to thereby increase the frictional resistance thereof, which increases gradually the necessary rotation power thereof with respect to the throttle grip SG.

Figure 6:
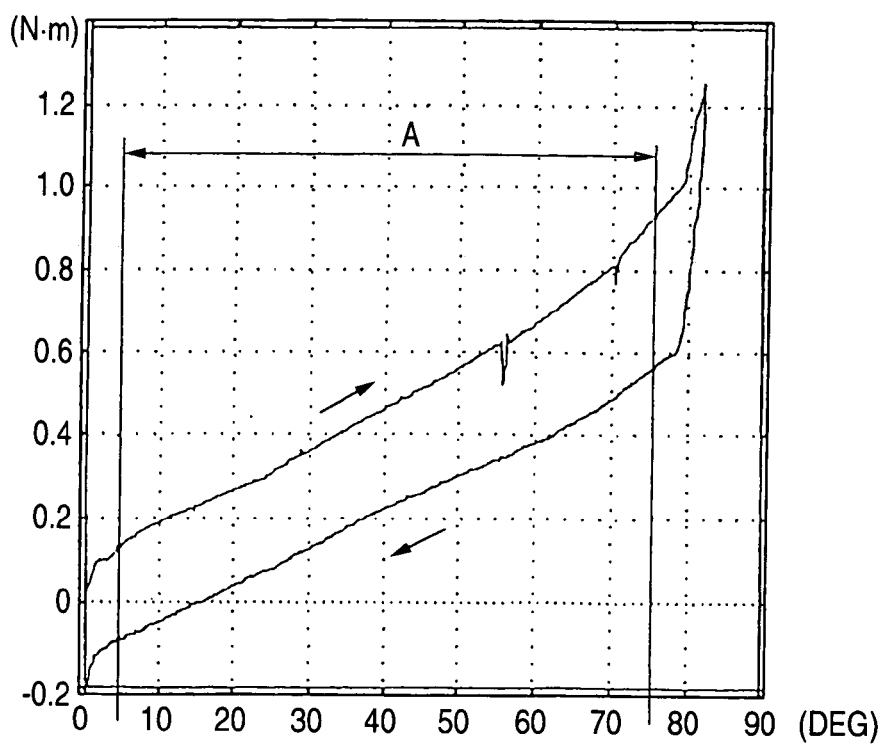

Here, the spiral spring 3, due to the frictional resistance of the mutually contacted portions thereof, causes a phenomenon that the spring characteristic of the spiral spring 3 in the load increasing time (when the spiral spring 3 is wound up) is different from that in the load reducing time (when the spiral spring 3 is returned to its initial shape), that is, the spiral spring 3 has a hysteresis characteristic. Therefore, between the rotation angles of the throttle grip SG and the frictional resistance of the spiral spring generated when the throttle grip is rotated, there is obtained such a relationship as shown in FIG. 6. Such graphical representation of FIG. 6 shows that the frictional resistance generated when the throttle grip SG is rotated from the initial state thereof is larger than the frictional resistance generated when it is returned to the initial state. By the way, in FIG. 6, reference character A designates an example of the usable range (the usable rotation angles of the throttle grip).

Figure 3:
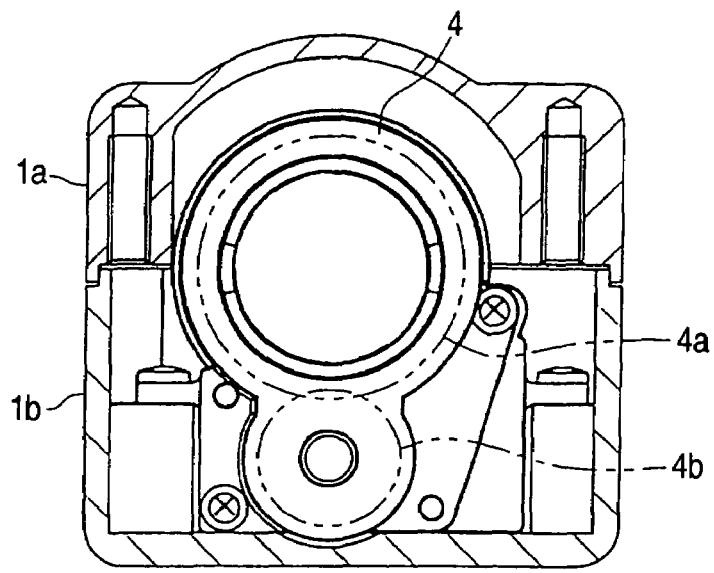
FIG. 3 is a section view taken along the line III-III shown in FIG. 1.

On the other hand, the two securing pawls 2a, which are disposed in the tube guide 2, are engaged with two securing pawls 4c formed in the throttle opening angle sensor 4 respectively. This throttle opening angle sensor 4 is a sensor which is disposed in the case 1 and is used to detect the rotation angle of the throttle grip SG; and, as shown in FIG. 3, the throttle opening angle sensor 4 includes a drive gear 4a, a driven gear 4b disposed in meshing engagement with the drive gear 4a, and a torsion spring 5 (FIG. 2).

And, in case where the tube guide 2 is rotated together with the throttle grip SG, the securing pawl 4c of the throttle grip SG engaged with the securing pawl 2a formed in the base end of the tube guide 2 is pressed to thereby rotate the drive gear 4a. When the drive gear 4a is rotated, the driven gear 4b meshingly engaged with the drive gear 4a is also rotated; and, therefore, by detecting the rotation angle of the driven gear 4b using a potentiometer (not shown), the rotation angle of the throttle grip SG, that is, the throttle opening angle can be detected.

The rotation angle of the throttle grip SG detected by the potentiometer in the above-mentioned manner is transmitted as an electric signal to an electronic control device carried on board a two-wheeled vehicle, and the electronic control device controls the engine (that is, it controls the ignition timing as well as the opening and closing of a valve) in accordance with the electric signal. By the way, the torsion spring is used to energize the drive gear 4a to return the same to the initial position thereof.

According to the above-structured throttle grip apparatus, there is used the spiral spring 3 as the means for energizing the throttle grip SG; and also, the spiral spring is mounted in such a manner that, with the rotation of the throttle grip SG from the initial state thereof, the spiral spring can be wound up. Thanks to this, the throttle grip apparatus can provide such a hysteresis characteristic as shown in FIG. 6 and thus it can obtain similar operation efficiency to the conventionally used general-purpose throttle grip apparatus including the operation cable.

That is, in the throttle grip apparatus which transmits the rotation of the throttle grip to the engine through the operation cable, the sliding resistance of the inner tube sliding within the outer tube has a hysteresis characteristic; and thus, in the present embodiment as well, a similar touch can be transmitted to the driver. Also, when compared with the throttle grip apparatus which enhances the operation efficiency of the throttle grip using a friction member or a similar member, the number of parts can be reduced. Further, according to the present embodiment, there can be obtained an operation touch more similar to the throttle grip apparatus using the operation cable.

Although description has been given heretofore of the preferred embodiment of the invention, the invention is not limited to the present embodiment. Specifically, the spiral spring may also be fixed by different methods. For example, one end 3a of the spiral spring 3 may be secured directly to the base end of the tube guide 2 using a screw, or the other end 3b may be secured to a recessed portion formed in the inner peripheral wall of the case. Also, in the present embodiment, the throttle grip apparatus is mounted on the handlebar of the two-wheeled vehicle. However, the throttle grip apparatus according to the invention may also be mounted to other kinds of vehicles (such as an ATV and a snowmobile) including a handlebar.

According to the invention as set forth in claim 1, not only because the energizing unit is composed of a spiral spring which is mounted on the base end side of the throttle grip, one end of which is fixed to the base end portion of the throttle grip and the other end of which is fixed to the case, but also because the spiral spring is mounted in such a manner that, as the throttle grip is rotated from the initial state thereof, it can be wound up, there can be generated a hysteresis in the rotation of the throttle grip. Therefore, while including the throttle opening angle sensor, the invention, when the throttle grip is rotated, can transmit to the driver such a touch as similar to the throttle grip apparatus including the operation cable.

What is claimed is:

1. A throttle grip apparatus, comprising:
a throttle grip rotatably mounted on the leading end of a handlebar of a vehicle;
a case disposed on the handlebar at a position being adjacent to the throttle grip;
a throttle opening angle sensor for detecting the rotation angle of the throttle grip and disposed in the case;
an energizing unit for energizing the throttle grip in a direction to return to the initial position thereof, an engine of the vehicle being controlled in accordance with the detected value of the throttle opening angle sensor,
wherein the energizing unit includes a spiral spring mounted on a base end side of the throttle grip and having one end fixed to the base end portion of the throttle grip and the other end fixed to the case, wherein the one end of the spiral spring and the other end of the spiral spring are disposed at substantially the same position in an axial direction of the throttle grip, and the spiral spring is wound up as the throttle grip is rotated from the initial state thereof to increase frictional resistance; and
a tube guide rotatable with said throttle grip and at least partially disposed in said case,
wherein one end of the spiral spring is bent and secured to recessed portion formed in the tube guide and the other end of said spiral spring is fixed to a bottom surface of an inside of a lower portion of the case.

2. A throttle grip apparatus as set forth in claim 1, wherein the spiral spring changes in such a manner that mutually contacted portions of the spiral spring increase gradually with the rotation of the throttle grip.

3. A throttle grip apparatus as set forth in claim 1, wherein the spiral spring has a hysteresis characteristic.

* * * * *